June 24, 1930. A. MOORHOUSE 1,766,922
MOTOR VEHICLE
Filed Nov. 6, 1925
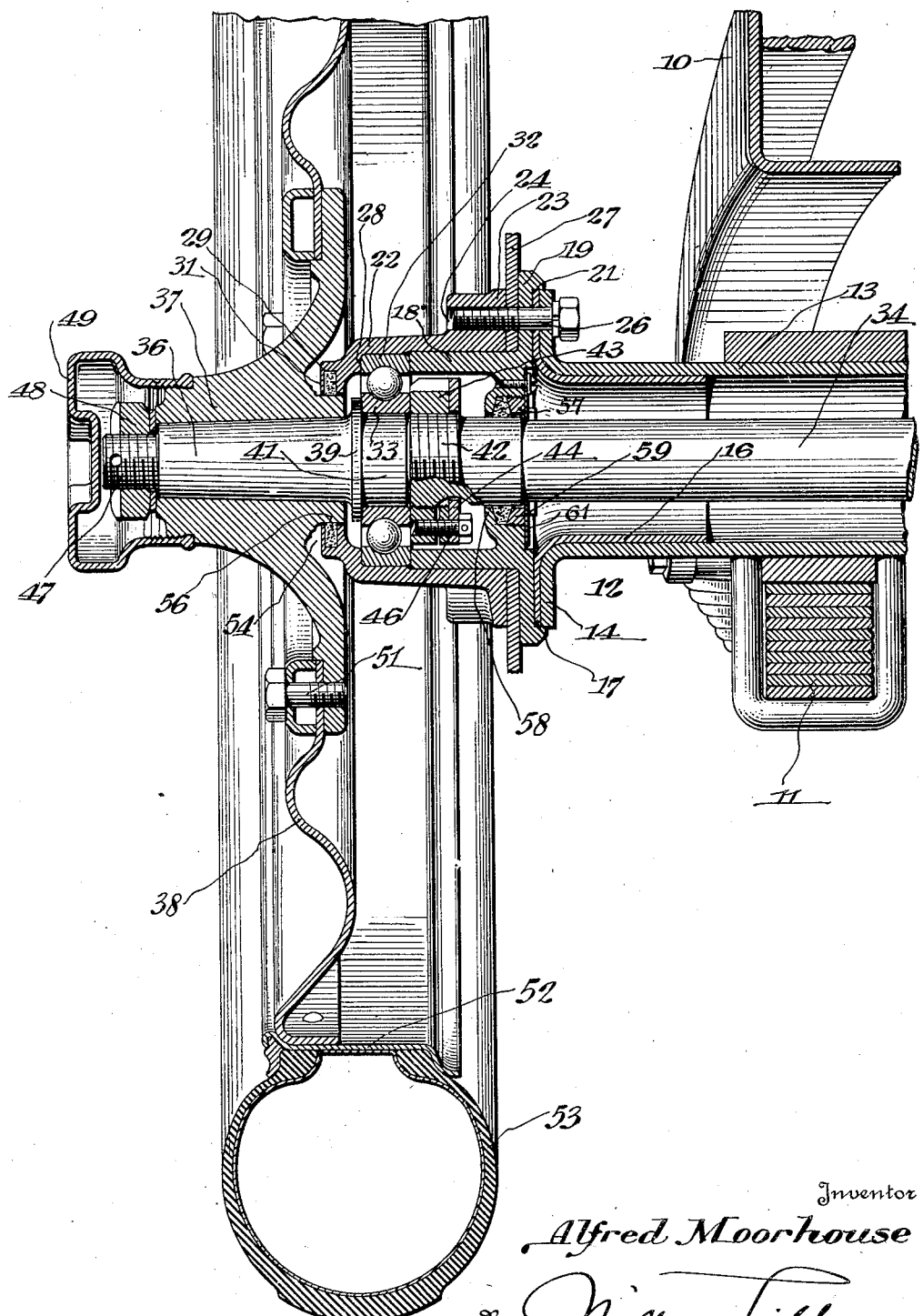
Inventor
Alfred Moorhouse
By Milton Tibbetts
Attorney Patented June 24, 1930

1,766,922

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed November 6, 1925. Serial No. 67,457.

This invention relates to motor vehicles and more particularly to the wheel and axle construction of such vehicles. It has for one of its objects to provide a stronger, simpler and less expensive mounting for the driving axle and wheels of a motor vehicle than such mountings now in use.

Another object of the invention is to provide a wheel mounting in which the radial and thrust load is carried on a single bearing of the type having deeply grooved races and a single row of balls, such bearing being located substantially in the plane of the driving wheel.

Another object of the invention is to provide a device of the character designated in which the amount of required machine operation on the parts during manufacture shall be materially reduced.

Other objects of the invention will appear from the following description taken in connection with the drawing, in which the single figure is a vertical section through the driving axle and wheel mounting of a motor vehicle constructed in accordance with the invention.

Referring to the drawing, at 10 is shown a part of the frame of a motor vehicle supported in the usual way through springs 11 from an axle 12. This axle constitutes the rear or driving axle of the vehicle and it consists of a differential and drive gear housing from which a tubular housing 13 projects on either side. As the structure of this gear housing and of the gearing therein is well known in the art to which this invention relates, and as it does not concern the present invention it has not been herein illustrated, and only the axle structure at one side of the vehicle is shown, the corresponding structure on the other side being in all respects identical therewith. It will be understood, however, that the gear housing and the housings 13 constitute a bridge or beam member on which the rear end of the vehicle chassis and its body is supported.

The tubular housing 13 is formed at its outer end with an integral flange 14, disposed radially of the housing. A short reenforcing member 16, of tubular form having a similar flange 17, is preferably inserted in the end of the housing 13 to strengthen the latter at the bend where the flange 14 commences. This flange 14 and the flange 17 are placed in abutting relation and the tube 16 is secured to the housing 13 in any appropriate manner, as by being welded thereto at the peripheries of the flanges. In axial alinement with the housing 13 is a two-part bearing supporting member or housing having an inner cylindrical member 18 provided at its inner end with a radial flange 19 arranged to abut the combined flanges 14 and 17 on the housing 13. The flange 19 is provided with a circumferential shoulder 21 adapted to co-operate with the periphery of the flanges 14 and 17 in such a manner as to aline the member 18 with respect to the housing 13, as will be readily understood.

Closely surrounding the member 18 in telescoping relation is a cylindrical member 22 forming the other portion of the bearing housing. The inner end of the member 22 is provided with an enlarged rim portion 23 provided with peripherally spaced holes 24 disposed axially with respect to the housing, which holes are preferably threaded for the reception of screws 26, or other appropriate clamping means. A brake supporting plate 27 may be conveniently clamped between the base of the member 23 and the outer face of the flange 19 and the member 18.

The member 22 is provided near the outer end thereof with an internal peripheral shoulder 28, and the outer end of this member is reduced in diameter and is provided with a groove 29 disposed radially inward and adapted to receive and support a packing ring 31 of any suitable construction.

Suitably positioned in the bearing support member is an annular ball bearing which may be of any suitable construction but which is preferably of the well known single-row deep-groove type adapted to take both radial load and axial thrust. The outer race 32 of this bearing is adapted to be positioned between the shoulder 28 and the outwardly disposed end of the member 18, these members having sufficient clearance to prevent binding of the race and preferably permitting it to creep without excessive end play.

The inner race 33 of this bearing is adapted to be removably secured to an axle drive shaft 34, the inner end of which is driven from the vehicle drive gearing in the usual manner and the outer end 36 of which is tapered for co-operation with the hub 37 of a vehicle driving wheel 38. At the inner end of the tapered portion 36, the shaft 34 is formed with an integral flange 39, which is adapted to co-operate with and position the inner race 33 of the supporting bearing. This inner bearing race is mounted upon a portion 41 of the shaft of increased diameter, adjacent which is a threaded portion 42 adapted to co-operate with a nut 43. This nut abuts the inner bearing race 33 which is thereby clamped rigidly against the flange 39 on the driving shaft. Inwardly of the threaded portion 42, the shaft is of smaller diameter to permit removal of the nut, which may be secured in adjusted position in any suitable manner, as by means of a locking ring 44 keyed to the shaft and secured to the nut by a bolt 46.

The outer end of the shaft 34, beyond the tapered portion 36, is provided with the usual threaded portion 47 of reduced diameter, adapted for co-operation with a nut 48 by means of which the wheel hub 37 is retained upon the shaft 34. This nut 48 is preferably concealed by a suitable hub cap 49 threaded in the usual way to the hub 37. The vehicle wheel 38, which may be of any suitable construction, but which, as illustrated, is of the disk type, is secured to the hub 37 by a circumferential row of bolts 51 in the usual manner, and this wheel is provided at its periphery with a rim 52 adapted to support the vehicle tire 53.

The inwardly disposed face of the hub 37 is formed with a circular groove 54 providing a shoulder 56 coaxial with the hub against which the packing ring 31 is adapted to bear, thus excluding dirt from the wheel bearing and preventing the escape of lubricant therefrom. A similar packing ring 57 is carried by the cylindrical bearing support member 18 near the inner face thereof, being mounted in a groove formed between an inwardly disposed lip 58 on the member 18 and a ring 59 threaded thereto and located in position in any suitable manner, as by means of the locking plate 61. The packing ring 57 is adapted to seat against the shaft 34 inwardly of the threaded portion 43 in such a manner as to prevent the escape of lubricant from the bearing housing at this point.

To disassemble the wheel bearing, therefore, the screws 26 are removed and the axle is withdrawn from the housing 13, thus exposing the nut 43 and its locking plate 44. After removal of the locking plate, the nut 43 may be readily unscrewed, thus permitting the shaft to be withdrawn from the inner bearing race 33. The inner and outer supporting sections 18 and 22 may be axially separated to disengage the outer bearing race 32 as soon as the screws 26 are removed.

It will be evident that this invention provides a structure which is not only much simpler in construction than axles at present in use, but in which the bearing is situated almost directly in the plane of the vehicle wheel. It will also be apparent that much expensive machine work required in axles as now constructed, is unnecessary, and this especially follows in the elimination of close fitting sleeves within the axle housing, so that the construction of the housing is not only much simpler but is less expensive.

It will be understood that various forms of the invention other than those described above may be used without departing from the spirit or scope of the invention.

I claim:

1. The combination in a motor vehicle of a wheel mounting comprising a tubular axle housing having an integral radial flange at the outer end thereof, a two-part bearing support having telescopic members each secured to the face of said flange, a bearing having an outer race secured between the parts of said support and having an inner race, means to secure said inner race to the axle, and a wheel having a hub portion removably secured to the end of said axle.

2. The combination in a motor vehicle of a wheel mounting comprising a tubular axle housing having an integral radial flange at the outer end thereof, an axle journaled in the housing, a bearing for said axle, a two-part member having telescopic members each removably secured to the flange and adapted to axially position said bearing, and means to removably secure the bearing in position on said axle, said two-part member enclosing the bearing and the axle securing means.

3. The combination in a motor vehicle of an axle and wheel mounting comprising a tubular housing having an integral flange radially disposed at the end thereof, a substantially cylindrical member having a radially disposed flange at its inner end adapted to abut the said housing flange, a co-operating member having a substantially cylindrical bore adapted to enclose the first named member and having an internal shoulder axially alined with the end of said first named member, a bearing having an outer race disposed between the end of the first named member and said internal shoulder, and means clamping the flange of the cylindrical member between the housing flange and the co-operating member and retaining said bearing race between the end of the cylindrical member and the shoulder.

4. An axle and wheel mounting for motor vehicles including a tubular housing having an integral flange at its end, an axle shaft disposed in said housing and projecting from the end thereof, a wheel hub keyed to the projecting end of said shaft, a bearing for said shaft having an inner race clamped to said shaft adjacent the hub and having an outer race, and tubular means removably secured to the flange in axial alinement with the housing to position said outer race.

5. An axle and wheel mounting for motor vehicles including a tubular housing having an integral flange at its end, an axle shaft disposed in said housing and projecting from the end thereof, a wheel hub keyed to the projecting end of said shaft, an integral flange on the shaft adjacent the inner end of said hub, a bearing having inner and outer races, means on said shaft clamping the inner race against said shaft flange, and means removably secured to the housing flange enclosing said shaft clamping means and adapted to position the outer race of the bearing.

6. The combination in a motor vehicle of an axle and wheel mounting comprising a tubular housing having a radially disposed flange at the end thereof, a two-part telescopic bearing supporting member, each part having a radial flange, a brake supporting member adapted to be clamped between the flanges of the bearing supporting member and means removably securing the said flanges and the brake supporting member to said housing flange.

7. The combination in a motor vehicle of an axle and wheel mounting comprising a tubular housing having a radially disposed flange at the end thereof, a telescopic bearing supporting member removably secured to the flange in axial alinement with the housing, a bearing mounted in the supporting member, an axle journaled in said bearing and projecting from the housing and the supporting member, and packing rings carried by the supporting member on either side of the bearing to prevent entry of dirt to and escape of lubricant from the bearing.

8. The combination in a motor vehicle of a tubular axle housing having a flanged end, an adjustable housing alined with and removable from the axle housing including outer and inner members in telescoping relation, an inner circumferential shoulder on the outer member alined with the end of the inner member, a bearing race between said shoulder and the end of said inner member, and means clamping said members to the flanged end and adapted to secure the bearing race between the shoulder and the inner member.

9. The combination in a motor vehicle of a tubular axle housing, an axle disposed in said housing, a telescoping two-part bearing housing each part removably secured to the end of the axle housing, and a bearing positioned between the parts of said telescoping housing supporting the axle.

10. A rear axle and wheel assembly for motor vehicles comprising a wheel, a hub therefor, an axle removably secured in said hub, a housing for the axle, an axle bearing secured to the axle, and a detachable bearing housing having two telescopic parts each removably secured to the end of the axle housing adapted to removably support said bearing and to enclose the axle securing means.

11. The combination in a motor vehicle of a tubular axle housing having a flanged end, a bearing housing removably secured to the axle housing, the bearing housing having an inner annular shoulder, a cylindrical member fitted into the housing, and a bearing race positioned between the inner annular shoulder and the cylindrical member.

12. The combination in a motor vehicle of a tubular axle housing having a flanged end, a bearing housing alined with and removably secured to the axle housing, the bearing housing including inner and outer cylindrical telescopic members, each having a flange adapted to be secured to the flanged end of the axle housing, the outer cylindrical member having an inner circumferential shoulder and a bearing race positioned between the shoulder and the free end of the inner telescopic member.

In testimony whereof I affix my signature.

ALFRED MOORHOUSE.